US011555429B2

(12) United States Patent
Nagafuchi et al.

(10) Patent No.: US 11,555,429 B2
(45) Date of Patent: Jan. 17, 2023

(54) GAS TURBINE PLANT AND EXHAUST CARBON DIOXIDE RECOVERY METHOD THEREFOR

(71) Applicants: Mitsubishi Power, Ltd., Kanagawa (JP); Mitsubishi Heavy Industries Engineering, Ltd., Kanagawa (JP)

(72) Inventors: Naoyuki Nagafuchi, Yokohama (JP); Atsushi Tsutsumi, Yokohama (JP); Takashi Kamijo, Yokohama (JP); Hiroaki Shigeta, Yokohama (JP)

(73) Assignees: MITSUBISHI HEAVY INDUSTRIES, LTD., Tokyo (JP); MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 17/433,044

(22) PCT Filed: Jan. 31, 2020

(86) PCT No.: PCT/JP2020/003694
§ 371 (c)(1),
(2) Date: Aug. 23, 2021

(87) PCT Pub. No.: WO2020/175012
PCT Pub. Date: Sep. 3, 2020

(65) Prior Publication Data
US 2022/0136416 A1    May 5, 2022

(30) Foreign Application Priority Data
Feb. 28, 2019    (JP) ............... JP2019-036442

(51) Int. Cl.
*F02C 3/04* (2006.01)
*F01N 3/08* (2006.01)
*F02C 6/10* (2006.01)

(52) U.S. Cl.
CPC .................. *F01N 3/08* (2013.01); *F02C 3/04* (2013.01); *F02C 6/10* (2013.01)

(58) Field of Classification Search
CPC ...... F02C 3/04; F02C 3/34; F02C 6/10; F02C 7/10; F05D 2260/61; F05D 2260/611
See application file for complete search history.

(56) References Cited

U.S. PATENT DOCUMENTS

2008/0010967 A1    1/2008    Griffin et al.
2010/0050637 A1    3/2010    Yamashita et al.
(Continued)

FOREIGN PATENT DOCUMENTS

EP    2 551 476    1/2013
EP    2 644 851    10/2013
(Continued)

OTHER PUBLICATIONS

International Search Report dated Mar. 17, 2020 in International Application No. PCT/JP2020/003694 with English translation.
(Continued)

*Primary Examiner* — Steven M Sutherland
(74) *Attorney, Agent, or Firm* — Wenderoth, Lind & Ponack, L.L.P.

(57) ABSTRACT

A gas turbine plant includes an exhaust line, a carbon dioxide recovery device configured to recover carbon dioxide contained in an exhaust gas, a circulation line connected to a gas turbine, a first valve device, a bypass line bypassing the carbon dioxide recovery device, a second valve device provided on the bypass line, a third valve device provided at a position between the bypass line and the carbon dioxide
(Continued)

recovery device, a densitometer configured to detect a carbon dioxide concentration in the exhaust gas, and a control device configured to adjust opening degrees of the first valve device, the second valve device, and the third valve device based on an operation state of the gas turbine and the carbon dioxide concentration.

7 Claims, 4 Drawing Sheets

(56) References Cited

U.S. PATENT DOCUMENTS

| | | | | |
|---|---|---|---|---|
| 2011/0277860 | A1* | 11/2011 | Mazumdar | F02C 6/10 137/565.01 |
| 2011/0289898 | A1 | 12/2011 | Hellat et al. | |
| 2011/0304155 | A1 | 12/2011 | Hoffmann et al. | |
| 2012/0186268 | A1 | 7/2012 | Rofka et al. | |
| 2012/0192564 | A1 | 8/2012 | Mishima et al. | |
| 2012/0291445 | A1 | 11/2012 | Rofka et al. | |
| 2014/0290264 | A1 | 10/2014 | Hövel | |
| 2018/0099247 | A1* | 4/2018 | Uebele | F02C 3/04 |

FOREIGN PATENT DOCUMENTS

| | | |
|---|---|---|
| JP | 2000-337108 | 12/2000 |
| JP | 2000-337109 | 12/2000 |
| JP | 2009-247932 | 10/2009 |
| JP | 2010-085078 | 4/2010 |
| JP | 2011-247264 | 12/2011 |
| JP | 2011-256870 | 12/2011 |
| JP | 2012-514151 | 6/2012 |
| JP | 2012-154330 | 8/2012 |
| JP | 2012-158996 | 8/2012 |
| JP | 2012-233472 | 11/2012 |
| JP | 2015-503059 | 1/2015 |
| JP | 5704937 | 4/2015 |
| JP | 2015-519499 | 7/2015 |
| JP | 5743728 | 7/2015 |
| JP | 5840559 | 1/2016 |
| JP | 5905119 | 4/2016 |
| WO | 2006/018389 | 2/2006 |
| WO | 2010/072710 | 7/2010 |
| WO | 2013/092411 | 6/2013 |
| WO | 2013/143827 | 10/2013 |

OTHER PUBLICATIONS

Written Opinion of the International Searching Authority dated Mar. 17, 2020 in International Application No. PCT/JP2020/003694 With English translation.

* cited by examiner

GAS TURBINE PLANT AND EXHAUST CARBON DIOXIDE RECOVERY METHOD THEREFOR

TECHNICAL FIELD

The present invention relates to a gas turbine plant including a gas turbine and an exhaust carbon dioxide recovery method therefor.

Priority is claimed on Japanese Patent Application No. 2019-036442, filed Feb. 28, 2019, the content of which is incorporated herein by reference.

BACKGROUND ART

In a power plant using fossil fuels, for example, a plant equipped with a gas turbine (gas turbine plant), an exhaust gas containing carbon dioxide is generated in accordance with an operation of the gas turbine. From the viewpoint of environmental protection, the technology of removing the carbon dioxide from the exhaust gas as much as possible is required. As such technology, for example, a plant disclosed in Patent Document 1 below is known.

The plant disclosed in Patent Document 1 includes a gas turbine, an exhaust heat recovery boiler provided along a flue gas path through which an exhaust gas of the gas turbine flows, and a $CO_2$ absorption device. Carbon dioxide contained in the exhaust gas is absorbed by an absorption liquid in the $CO_2$ absorption device, and then stored after being compressed and liquefied.

CITATION LIST

Patent Document

[Patent Document 1]
Published Japanese Translation No. 2015-519499 of the PCT International Publication

SUMMARY OF INVENTION

Technical Problem

In the gas turbine plant, a carbon dioxide concentration contained in the exhaust gas is significantly lower than that of a coal-fired power plant in the related art, and thus in a case in which a carbon dioxide absorption device for the coal-fired power plant is used, there are problems in recovery of the carbon dioxide, such as cost increases due to large equipment and inefficient operation.

The present invention has been made to solve the above problems, and is to provide a gas turbine plant and an exhaust carbon dioxide recovery method therefor which can further efficiently perform recovery of the carbon dioxide.

Solution to Problem

An aspect of the present invention relates to a gas turbine plant including a gas turbine configured to receive fuel in accordance with a required output, combust the fuel, and be driven by a combustion gas generated by combusting the fuel, an exhaust line configured to guide an exhaust gas exhausted from the gas turbine to an outside, a carbon dioxide recovery device provided on the exhaust line and configured to recover carbon dioxide contained in the exhaust gas flowing through the exhaust line, a circulation line branching from a position on the exhaust line on an upstream side in a flow direction of the exhaust gas with the carbon dioxide recovery device as a reference and connected to the gas turbine, a first valve device provided on the circulation line, a bypass line branching from a position on the exhaust line on a downstream side of the circulation line in the flow direction and the upstream side of the carbon dioxide recovery device, bypassing the carbon dioxide recovery device, and connected to a position on the exhaust line on a downstream side of the carbon dioxide recovery device, a second valve device provided on the bypass line, a third valve device provided on the exhaust line at a position between the bypass line and the carbon dioxide recovery device, a densitometer provided on the exhaust line and configured to detect a carbon dioxide concentration in the exhaust gas, and a control device configured to adjust opening degrees of the first valve device, the second valve device, and the third valve device based on at least one of an operation state of the gas turbine and the carbon dioxide concentration.

Note that the "valve" and the "valve device" herein are not technically limited to those that can be sealed, and include, for example, a device, such as a damper, that can adjust a flow rate. With the configuration described above, the control device adjusts the opening degrees of the first valve device, the second valve device, and the third valve device based on at least one of the operation state of the gas turbine and the carbon dioxide concentration in the exhaust gas. As a result, for example, immediately after the gas turbine is activated, by closing the first valve device and the third valve device and opening the second valve device, the exhaust gas bypasses the carbon dioxide recovery device through the exhaust line and the bypass line, and flows into the downstream side. Therefore, the exhaust gas containing a large amount of NOx or unburned hydrocarbon immediately after the activation does not flow into the carbon dioxide recovery device. As a result, a possibility that the performance of the carbon dioxide recovery device is deteriorated can be reduced. Further, for example, after a predetermined time has elapsed from activation of the gas turbine, the control device adjusts the opening degree of the first valve device in a direction of increasing the opening degree from the state described above, so that a part of the exhaust gas is supplied again to the gas turbine through the circulation line. As a result, the carbon dioxide in the exhaust gas is concentrated. That is, since the carbon dioxide concentration per unit flow rate of the exhaust gas is increased, the carbon dioxide recovery device can further efficiently recover the carbon dioxide.

In the gas turbine plant described above, the control device may be configured to close the first valve device and the third valve device and open the second valve device until a predetermined time elapses from activation of the gas turbine.

With the configuration described above, immediately after the gas turbine is activated, by closing the first valve device and the third valve device and opening the second valve device, the exhaust gas passes through the exhaust line and the bypass line, bypasses the carbon dioxide recovery device, and flows into the downstream side. As a result, the exhaust gas containing a large amount of NOx or unburned hydrocarbon immediately after the activation does not flow into the carbon dioxide recovery device. As a result, a possibility that the performance of the carbon dioxide recovery device is deteriorated can be reduced.

In the gas turbine plant described above, the control device may be configured to, after a predetermined time has elapsed from activation of the gas turbine, adjust the opening degree of the first valve device in a direction of increasing the opening degree in a state in which the second valve device is opened and the third valve device is closed.

With the configuration described above, after the predetermined time has elapsed from activation of the gas turbine, the control device adjusts the opening degree of the first valve device in a direction of increasing the opening degree from the state described above, so that a part of the exhaust gas is supplied again to the gas turbine through the circulation line. As a result, the carbon dioxide in the exhaust gas is concentrated. That is, since the carbon dioxide concentration per unit flow rate of the exhaust gas is increased, the carbon dioxide recovery device can further efficiently recover the carbon dioxide. As a result, it is possible to reduce a processing capacity required for the carbon dioxide recovery device.

In the gas turbine plant described above, the control device may be configured to, after a predetermined time has elapsed from activation of the gas turbine, close the second valve device and open the third valve device in a case in which the carbon dioxide concentration is larger than a predetermined threshold value.

With the configuration described above, in a case in which the carbon dioxide concentration in the exhaust gas is larger than the threshold value, the control device closes the second valve device and opens the third valve device. As a result, the exhaust gas containing a high concentration of the carbon dioxide is supplied to the carbon dioxide recovery device. Since the carbon dioxide concentration per unit flow rate of the exhaust gas is high, the carbon dioxide recovery device can further efficiently recover the carbon dioxide. As a result, it is possible to further reduce the processing capacity required for the carbon dioxide recovery device. Note that under conditions not described herein, the second valve device may be closed and the third valve device may be opened even in a case in which the carbon dioxide concentration is lower than the threshold value.

The gas turbine plant described above may further include an exhaust gas compressor provided on the circulation line and configured to increase a pressure of the exhaust gas flowing through the circulation line.

With the configuration described above, the exhaust gas on the circulation line is supplied to the gas turbine in a state of being compressed by the exhaust gas compressor. As a result, it possible to reduce a pressure loss in a case in which the exhaust gas flows into the gas turbine. As a result, the gas turbine can be further stably and efficiently operated.

The gas turbine plant described above may further include an exhaust heat recovery boiler configured to generate steam by heat of the exhaust gas exhausted from the gas turbine and guide the exhaust gas passing through an inside of the exhaust heat recovery boiler itself to the exhaust line, in which the carbon dioxide recovery device includes a regeneration tower configured to regenerate an absorption liquid that absorbs the carbon dioxide in the carbon dioxide recovery device by water heated by the exhaust heat recovery boiler or the steam generated by the exhaust heat recovery boiler.

With the configuration described above, the steam is generated by the heat of the exhaust gas of the gas turbine by the exhaust heat recovery boiler. Due to the steam, the carbon dioxide, which is chemically bonded to the absorption liquid, is removed (recovered) in the regeneration tower inside the carbon dioxide recovery device. That is, with the configuration described above, the absorption liquid can be regenerated by the heat generated inside the gas turbine plant, that is, the heat recovered from the exhaust gas, without using another heat source.

The gas turbine plant described above may further include an exhaust heat recovery boiler configured to generate steam by heat of the exhaust gas exhausted from the gas turbine and guide the exhaust gas passing through an inside of the exhaust heat recovery boiler itself to the exhaust line, and an exhaust gas heater disposed on the exhaust line on the downstream side of the carbon dioxide recovery device in a flow of the exhaust gas, in which the exhaust gas heater is a heat exchanger configured to heat the exhaust gas by performing heat exchange between water heated by the exhaust heat recovery boiler or steam generated by the exhaust heat recovery boiler and the exhaust gas flowing through the exhaust line.

With the configuration described above, the temperature of the exhaust gas rises by performing the heat exchange between the high-temperature water or the steam and the exhaust gas by the exhaust gas heater. As a result, it is possible to reduce a possibility that moisture contained in the exhaust gas condenses to cause dew condensation. Further, since the water or the steam that exchanges the heat with the exhaust gas is supplied from the exhaust heat recovery boiler, the exhaust gas can be heated without using another heat source.

Another aspect of the present invention relates to an exhaust carbon dioxide recovery method for a gas turbine plant including a gas turbine configured to receive fuel in accordance with a required output, combust the fuel, and be driven by a combustion gas generated by combusting the fuel, an exhaust line configured to guide an exhaust gas exhausted from the gas turbine to an outside, a carbon dioxide recovery device provided on the exhaust line and configured to recover carbon dioxide contained in the exhaust gas flowing through the exhaust line, a circulation line branching from a position on the exhaust line on an upstream side in a flow direction of the exhaust gas with the carbon dioxide recovery device as a reference and connected to the gas turbine, a first valve device provided on the circulation line, a bypass line branching from a position on the exhaust line on a downstream side of the circulation line in the flow direction and the upstream side of the carbon dioxide recovery device, bypassing the carbon dioxide recovery device, and connected to a position on the exhaust line on a downstream side of the carbon dioxide recovery device, a second valve device provided on the bypass line, a third valve device provided on the exhaust line at a position between the bypass line and the carbon dioxide recovery device, and a densitometer provided on the exhaust line and configured to detect a carbon dioxide concentration in the exhaust gas, the method including adjusting opening degrees of the first valve device, the second valve device, and the third valve device based on at least one of an operation state of the gas turbine and the carbon dioxide concentration.

With the method described above, the opening degrees of the first valve device, the second valve device, and the third valve device are adjusted based on at least one of the operation state of the gas turbine and the carbon dioxide concentration in the exhaust gas. As a result, for example, immediately after the gas turbine is activated, by closing the first valve device and the third valve device and opening the second valve device, the exhaust gas bypasses the carbon dioxide recovery device through the exhaust line and the bypass line, and flows into the downstream side. Therefore, the exhaust gas containing a large amount of NOx or unburned hydrocarbon immediately after the activation does not flow into the carbon dioxide recovery device. As a result, a possibility that the performance of the carbon dioxide recovery device is deteriorated can be reduced. Further, for example, after a predetermined time has elapsed from activation of the gas turbine, the opening degree of the first valve device is adjusted in a direction of increasing the opening degree from the state described above, so that a part of the exhaust gas is supplied again to the gas turbine through the circulation line. As a result, the carbon dioxide in the exhaust gas is concentrated. That is, since the carbon dioxide concentration per unit flow rate of the exhaust gas is increased, the carbon dioxide recovery device can further efficiently recover the carbon dioxide.

Advantageous Effects of Invention

According to the present invention, it is possible to provide a gas turbine plant and an exhaust carbon dioxide recovery method therefor which can further efficiently perform recovery of the carbon dioxide.

DESCRIPTION OF EMBODIMENTS

Figure 1:
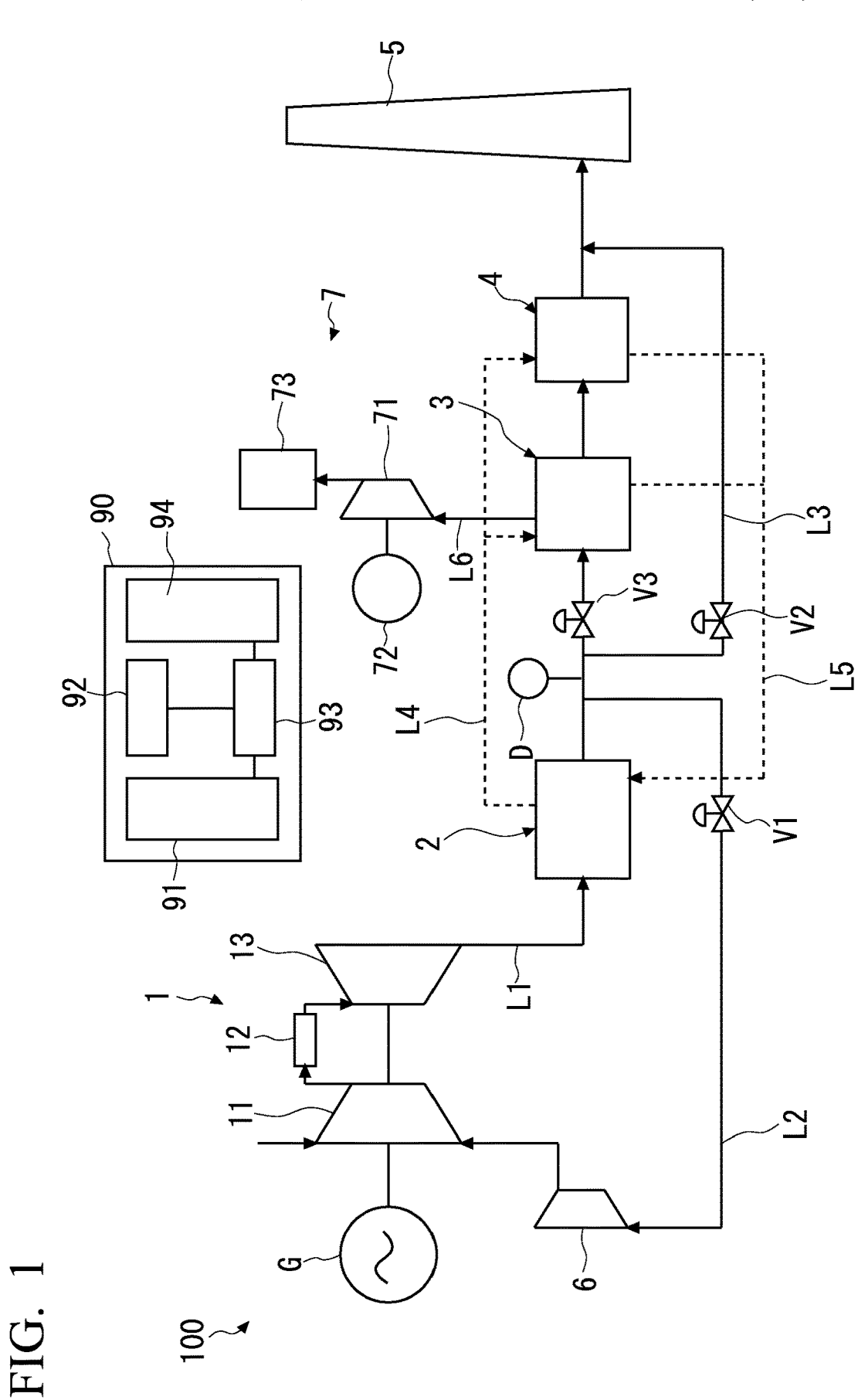
FIG. 1 is a diagram showing a configuration of a gas turbine plant according to an embodiment of the present invention.
Figure 2:
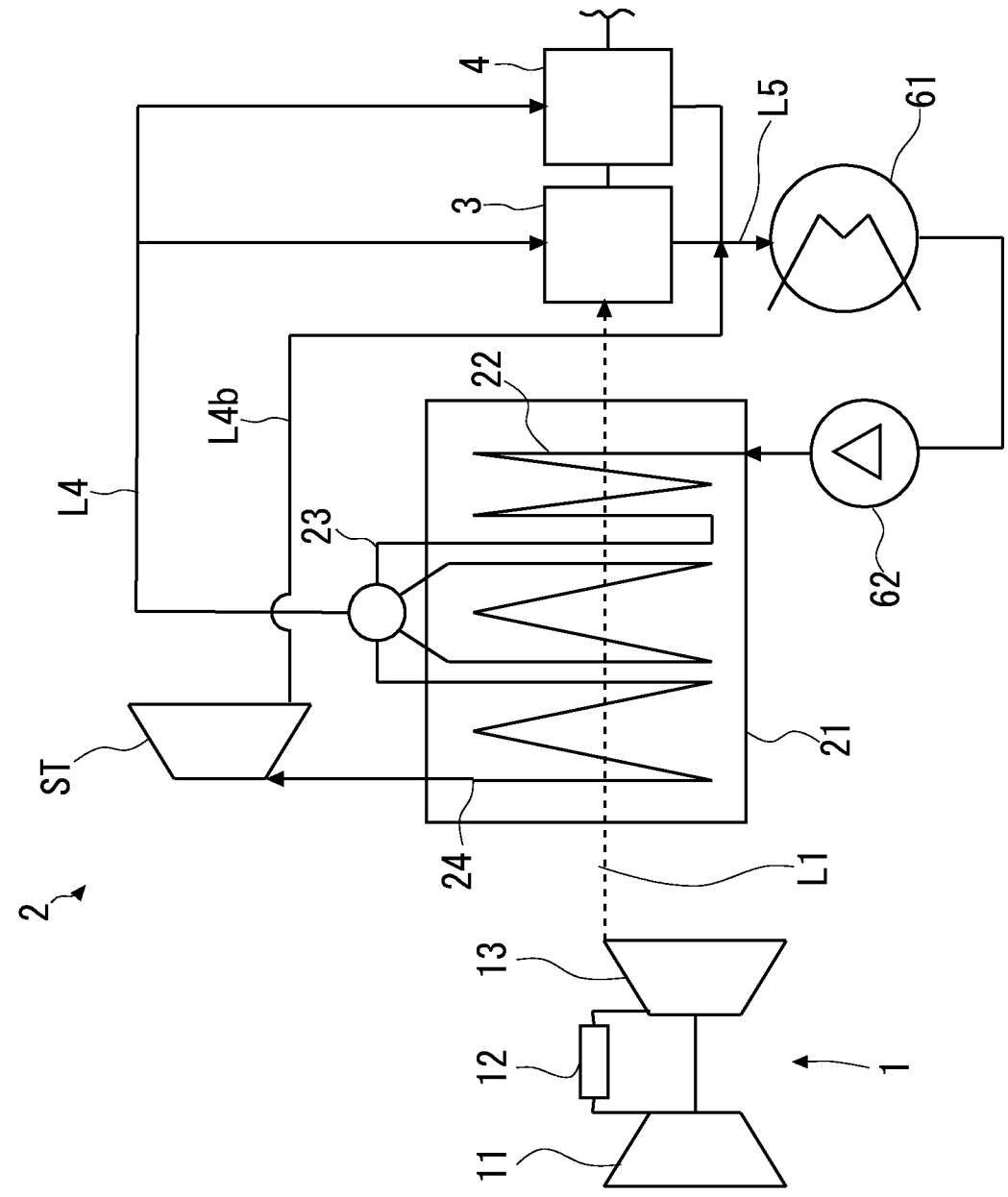
FIG. 2 is a diagram showing a configuration of an exhaust heat recovery boiler according to the embodiment of the present invention.
Figure 3:
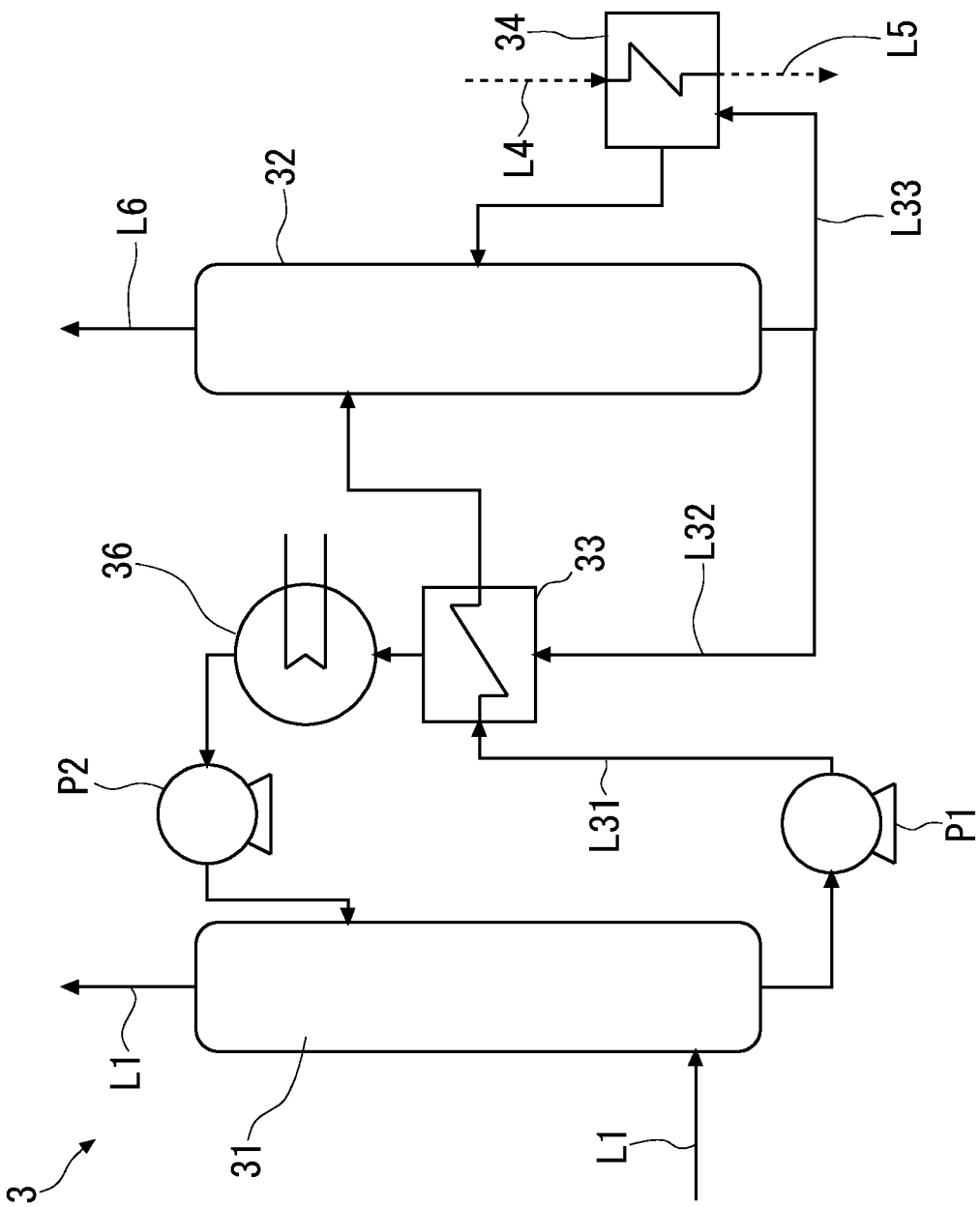
FIG. 3 is a diagram showing a configuration of a carbon dioxide recovery device according to the embodiment of the present invention.

An embodiment of the present invention will be described with reference to FIGS. 1 to 3. As shown in FIG. 1, a gas turbine plant 100 according to the present embodiment includes a gas turbine 1, an exhaust heat recovery boiler 2, a carbon dioxide recovery device 3, an exhaust gas heater 4, a funnel 5, an exhaust gas compressor 6, a carbon dioxide compression device 7, an exhaust line L1, a circulation line L2, a bypass line L3, a first valve device V1, a second valve device V2, a third valve device V3, and a control device 90. Note that the "valve" and the "valve device" herein are not limited to those that can seal a flow path, also include a device, such as a damper, that can adjust the flow rate.

The gas turbine 1 includes a compressor 11, a combustor 12, and a turbine 13. The compressor 11 compresses air introduced from the outside to generate high-pressure compressed air. The combustor 12 mixes fuel with this compressed air and combusts the mixture to generate a high-temperature and high-pressure combustion gas. The turbine 13 is rotationally driven by the combustion gas. The rotating force of the turbine 13 is used, for example, to drive a generator G coaxially connected to the turbine 13. A high-temperature exhaust gas is discharged from the turbine 13. This exhaust gas is transported to the exhaust heat recovery boiler 2 provided on an exhaust line L1 by the exhaust line L1 connected to a downstream side of the turbine 13.

The exhaust heat recovery boiler 2 generates high-temperature and high-pressure steam by performing the heat exchange between the exhaust gas of the gas turbine 1 and the water. The configuration of the exhaust heat recovery boiler will be described below. The carbon dioxide recovery device 3 is provided on the exhaust line L1 on a downstream side of the exhaust heat recovery boiler 2. A low-temperature exhaust gas that is heat-exchanged with the water in the exhaust heat recovery boiler 2 is transported to the carbon dioxide recovery device 3 through the exhaust line L1.

In the carbon dioxide recovery device 3, carbon dioxide contained in the exhaust gas is chemically bonded to an absorption liquid by bringing the absorption liquid containing amine as a main component and the exhaust gas into gas-liquid contact. As a result, at least a part of components of the carbon dioxide in the exhaust gas is removed. The configuration of the carbon dioxide recovery device 3 will be described below. The exhaust gas heater 4 is provided on the exhaust line L1 on a downstream side of the carbon dioxide recovery device 3. The exhaust gas from which the carbon dioxide has been removed is transported to the exhaust gas heater 4 through the exhaust line L1. Note that the absorption liquid may be a chemical absorption agent having a component other than amine.

On the other hand, the carbon dioxide separated from the exhaust gas is transported to the carbon dioxide compression device 7 through a recovery line L6. The carbon dioxide compression device 7 includes a compressor body 71, a drive unit 72, and a storage unit 73. The compressor body 71 compresses the carbon dioxide by being driven by the drive unit 72. The compressed carbon dioxide is transported to the storage unit 73.

The exhaust gas heater 4 heats the exhaust gas by performing the heat exchange between the steam generated in the exhaust heat recovery boiler 2 described above and the exhaust gas. As a result, it is possible to reduce a possibility that moisture contained in the exhaust gas evaporates to cause dew condensation in the exhaust line L1. The funnel 5 is provided on the exhaust line L1 on a downstream side of the exhaust gas heater 4. The exhaust gas discharged from the exhaust gas heater 4 is diffused into the atmosphere by the funnel 5.

Further, one end of the circulation line L2 branching from the exhaust line L1 is connected on the exhaust line L1 at a position between the exhaust heat recovery boiler 2 and the carbon dioxide recovery device 3. The other end of the circulation line L2 is connected to the compressor 11 of the gas turbine 1. That is, a part of the exhaust gas flowing through the exhaust line L1 can be returned to the gas turbine 1 (compressor 11) through the circulation line L2. The first valve device V1 and the exhaust gas compressor 6 are provided on the circulation line L2. By adjusting an opening degree of the first valve device V1, a flow rate of the exhaust gas flowing through the circulation line L2 can be changed. Note that, as will be described in detail below, the opening degree of the first valve device V1 is adjusted by a command from the control device 90. The exhaust gas compressor 6 is provided to increase a pressure of the exhaust gas flowing through the circulation line L2 and pump the exhaust gas to the compressor 11.

One end of the bypass line L3 branching from the exhaust line L1 is connected to a position on the exhaust line L1 on a downstream side of a branch point between the circulation line L2 and the exhaust line L1 and an upstream side of the carbon dioxide recovery device 3. The other end of the bypass line L3 is connected to a position on the exhaust line L1 on the downstream side of the exhaust gas heater 4. The second valve device V2 is provided on the bypass line L3. By adjusting an opening degree of the second valve device V2, a flow rate of the exhaust gas flowing through the bypass line L3 can be changed. Note that, as will be described in detail below, the opening degree of the second valve device V2 is adjusted by the command from the control device 90.

A third valve device V3 is provided on the exhaust line L1 at a position on a downstream side of a branch point between the bypass line L3 and the exhaust line L1 and an upstream side of the carbon dioxide recovery device 3. By adjusting an opening degree of the third valve device V3, a flow rate of the exhaust gas flowing into the carbon dioxide recovery device 3 from the exhaust line L1 can be adjusted. The opening degree of the third valve device V3 is also adjusted by the command from the control device 90. Further, a densitometer D that detects a carbon dioxide concentration of the exhaust gas flowing through the exhaust line L1 is provided on the upstream side of the third valve device V3. The densitometer D quantifies the carbon dioxide concentration of the exhaust gas and transmits the quantified carbon dioxide concentration to the control device 90 as an electric signal.

The exhaust heat recovery boiler 2 is connected to the carbon dioxide recovery device 3 and the exhaust gas heater 4 by a steam supply line L4. The steam generated in the exhaust heat recovery boiler 2 is supplied to the carbon dioxide recovery device 3 and the exhaust gas heater 4 through this steam supply line L4. As will be described in detail below, in the carbon dioxide recovery device 3, the carbon dioxide is separated from the absorption liquid in a state in which the carbon dioxide is bonded, by the heat of the steam supplied through the steam supply line L4. The exhaust gas heater 4 heats the exhaust gas by performing the heat exchange between the steam supplied through the steam supply line L4 and the exhaust gas. The low-temperature steam (or water) that is used in the carbon dioxide recovery device 3 and the exhaust gas heater 4 is transported to the exhaust heat recovery boiler 2 again through a steam recovery line L5.

Next, a configuration of the exhaust heat recovery boiler 2 will be described with reference to FIG. 2. As shown in FIG. 2, the exhaust heat recovery boiler 2 includes a flue 21, an economizer 22, an evaporator 23, and a superheater 24, which are disposed in the flue 21, a steam turbine ST, a condenser 61, and a water supply pump 62. In the flue 21, the economizer 22, the evaporator 23, and the superheater 24 are arranged in this order from the downstream side to the upstream side in a flow direction of the exhaust gas.

The economizer 22 is connected to a downstream side of the steam recovery line L5. The carbon dioxide recovery device 3, the condenser 61 that restores the low-temperature steam recovered from the exhaust gas heater 4 to the water, and the water supply pump 62 that pumps the water are provided on the steam recovery line L5. The economizer 22 heats the water transported through the steam recovery line L5. The evaporator 23 further heats the high-temperature water heated by the economizer 22 to generate steam. This steam is transported to the superheater 24. The superheater 24 generates superheated steam by superheating the steam.

The superheated steam generated by the superheater 24 is transported to the steam turbine ST. The steam turbine ST is rotationally driven by the steam to supply power to a coaxially connected generator and the like (not shown). Further, at least a part of the steam generated by the evaporator 23 is transported to the carbon dioxide recovery device 3 and the exhaust gas heater 4 through the steam supply line L4 described above and used as a heat source. Further, the exhaust of the steam turbine ST is transported to the condenser 61 through a turbine exhaust line L4b. Note that it is also possible to adopt a configuration in which the steam turbine ST is not provided.

Then, a configuration of the carbon dioxide recovery device 3 will be described with reference to FIG. 3. As shown in FIG. 3, the carbon dioxide recovery device 3 includes an absorption tower 31, a regeneration tower 32, a heat exchanger 33, a reboiler 34, a cooler 36, a first pump P1, and a second pump P2.

The absorption tower 31 has a tubular shape extending in a vertical direction, and the exhaust line L1 is connected to a lower portion thereof. Inside the absorption tower 31, the absorption liquid, which can be chemically bonded to the carbon dioxide, flows from above to below. Note that specifically, as such an absorption liquid, an aqueous solution of amine containing monoethanolamine (MEA), diethanolamine (DEA), triethanolamine (TEA), diisopropanolamine (DIPA), methyldiethanolamine (MDEA) or an organic solvent containing no water, a mixture thereof, and an amino acid-based aqueous solution are preferably used. Further, the absorption liquid other than amine may be used.

The exhaust gas flowing into the lower portion of the absorption tower 31 rises in the absorption tower 31 while coming into contact with the absorption liquid flowing from above. At this time, the carbon dioxide contained in the exhaust gas is chemically absorbed by the absorption liquid. A residual exhaust gas from which the carbon dioxide has been removed flows into the exhaust line L1 again from an upper portion of the absorption tower 31.

The absorption liquid that has absorbed the carbon dioxide is transported to the heat exchanger 33 through an absorption liquid recovery line L31 connected to the lower portion of the absorption tower 31. Note that the first pump P1 that pumps the absorption liquid is provided on the absorption liquid recovery line L31. As will be described in detail below, in the heat exchanger 33, the heat exchange is performed between the absorption liquid regenerated by heating in the regeneration tower 32 and the absorption liquid before regeneration. As a result, the temperature of the absorption liquid before the regeneration is lowered to a certain extent. After passing through the heat exchanger 33, the absorption liquid before the regeneration is transported to an upper portion of the regeneration tower 32 through the absorption liquid recovery line L31.

The regeneration tower 32 is a device that regenerates the absorption liquid in a state in which the carbon dioxide is absorbed (separates the carbon dioxide). An absorption liquid heating line L33 is provided from the lower portion to the upper portion of the regeneration tower 32. The reboiler 34 is provided on the absorption liquid heating line L33. High-temperature steam is supplied to the reboiler 34 from the steam supply line L4 described above. In the reboiler 34, a part of the water contained in the absorption liquid is heated by the heat exchange with the steam to become stripping steam. The stripping steam comes into contact with the absorption liquid before the regeneration, which is supplied from the absorption liquid recovery line, in the regeneration tower 32. As a result, the carbon dioxide is diffused from the absorption liquid before the regeneration, and the absorption liquid is regenerated (becomes a state of containing no carbon dioxide). The carbon dioxide diffused from the absorption liquid before the regeneration is transported to the carbon dioxide compression device 7 described above through the recovery line L6 connected to the upper portion of the regeneration tower 32.

A part of the absorption liquid after the regeneration (that is, a component which is not the stripping steam) is transported to an extraction line L32 connected to the lower portion of the regeneration tower 32. The heat exchanger 33, the cooler 36, and the second pump P2 are provided on the extraction line L32 in this order. By driving the second pump P2, the absorption liquid after the regeneration is supplied from the regeneration tower 32 to the heat exchanger 33. Note that the second pump P2 may be provided between the heat exchanger 33 and the regeneration tower 32, or between the cooler 36 and the heat exchanger 33. In the heat exchanger 33, as described above, the heat exchange is performed between the absorption liquid before the regeneration and the absorption liquid after the regeneration. The absorption liquid after the regeneration passes through the heat exchanger 33 and the cooler 36 to have a low temperature. The low-temperature absorption liquid after the regeneration is supplied to the upper portion of the absorption tower 31.

Then, the control device 90 will be described. As shown in FIG. 1, the control device 90 includes an input unit 91, a timer 92, a determination unit 93, and a valve adjustment unit 94. The carbon dioxide concentration in the exhaust gas is input in a state of being quantified by the densitometer D described above, as the electric signal to the input unit 91. The timer 92 starts counting the time at the same time as the gas turbine 1 is activated, and when the predetermined time has elapsed, the timer 92 transmits a signal indicating a lapse of time to the determination unit 93, which will be described below. Note that the "predetermined time" referred herein can be appropriately set depending on the purpose. In the present embodiment, the "predetermined time" refers to the time required from the activation of the gas turbine 1 until the gas turbine has stable rotation and no load. The determination unit 93 determines whether or not the carbon dioxide concentration is within a predetermined threshold value and whether or not the predetermined time described above has elapsed. The valve adjustment unit 94 transmits a signal for adjusting the opening degrees of the first valve device V1, the second valve device V2, and the third valve device V3 based on the signal transmitted from the determination unit 93.

Next, an operation of the gas turbine plant 100 according to the present embodiment will be described. By driving the gas turbine 1, the exhaust gas is generated from the turbine 13. This exhaust gas passes through the exhaust heat recovery boiler 2 to have a low temperature, and then flows into the carbon dioxide recovery device 3. In the carbon dioxide recovery device 3, the carbon dioxide is removed from the exhaust gas as described above. Thereafter, the exhaust gas is heated by the exhaust gas heater 4 and then diffused into the atmosphere from the funnel 5. The carbon dioxide, which is removed from the exhaust gas, is liquefied and stored by the carbon dioxide compression device 7.

Here, the property of the exhaust gas of the gas turbine 1 differs depending on an operation state of the gas turbine 1. For example, immediately after the gas turbine 1 is activated, the exhaust gas is in a state of containing a large amount of NOx or unburned hydrocarbon. In a case in which the exhaust gas is supplied to the carbon dioxide recovery device 3 in a state in which these substances are contained, there is a possibility that the absorption liquid is degenerated or deteriorated. Further, immediately after the gas turbine 1 is activated, the carbon dioxide concentration in the exhaust gas is lower than that in a rated operation, so that there is a possibility that the efficiency in the recovery of the carbon dioxide is lowered.

Therefore, in the present embodiment, the opening degrees of the first valve device V1, the second valve device V2, and the third valve device V3 are adjusted by the control device 90, as a result, circulation states of the circulation line L2 and the bypass line L3 are adjusted.

Specifically, the control device 90 adjusts the opening degrees of the first valve device V1, the second valve device V2, and the third valve device V3 based on at least one of the operation state of the gas turbine 1 and the carbon dioxide concentration in the exhaust gas. Immediately after the gas turbine 1 is activated, the control device 90 closes the first valve device V1 and the third valve device V3, and opens the second valve device V2. As a result, the exhaust gas passes through the exhaust line L1 and the bypass line L3, bypasses the carbon dioxide recovery device 3, and flows into the funnel 5 on the downstream side of the carbon dioxide recovery device. Therefore, the exhaust gas containing a large amount of NOx or unburned hydrocarbon immediately after the activation does not flow into the carbon dioxide recovery device 3. As a result, the possibility that the performance of the carbon dioxide recovery device 3 (property of the absorption liquid) is deteriorated can be reduced.

Further, from the above state, after the predetermined time has elapsed from the activation of the gas turbine 1, the control device 90 adjusts the opening degree of the first valve device V1 in a direction of increasing the opening degree. As a result, after the predetermined time has elapsed from the activation of the gas turbine 1, a part of the exhaust gas is supplied again to the compressor 11 of the gas turbine 1 through the circulation line L2. As a result, the carbon dioxide in the exhaust gas is concentrated. That is, it is possible to increase the carbon dioxide concentration per unit flow rate of the exhaust gas.

In addition, from the above state, after the predetermined time has elapsed from the activation of the gas turbine 1, the control device 90 closes the second valve device V2 and opens the third valve device V3 in a case in which the carbon dioxide concentration is larger than the predetermined threshold value. As a result, the exhaust gas containing a high concentration of the carbon dioxide is supplied to the carbon dioxide recovery device 3. Since the carbon dioxide concentration per unit flow rate of the exhaust gas is high, the carbon dioxide recovery device 3 can further efficiently recover the carbon dioxide. As a result, it is possible to further reduce the processing capacity required for the carbon dioxide recovery device 3. Note that under conditions not described herein, the second valve device V2 may be closed and the third valve device V3 may be opened even in a case in which the carbon dioxide concentration is lower than the threshold value.

Further, with the configuration described above, the exhaust gas on the circulation line L2 is supplied to the gas turbine 1 in a state of being compressed by the exhaust gas compressor 6. As a result, it possible to reduce a pressure loss in a case in which the exhaust gas flows into the gas turbine 1. As a result, the gas turbine 1 can further be stably and efficiently operated.

Further, with the configuration described above, the steam is generated by the heat of the exhaust gas of the gas turbine 1 by the exhaust heat recovery boiler 2. Due to the steam, the carbon dioxide, which is chemically bonded to the absorption liquid, is removed (recovered) in the regeneration tower 32 inside the carbon dioxide recovery device 3. That is, with the configuration described above, the absorption liquid can be regenerated by the heat recovered from the exhaust gas without using another heat source.

In addition, with the configuration described above, the temperature of the exhaust gas rises by performing the heat exchange between the high-temperature water or the steam and the exhaust gas by the exhaust gas heater 4. As a result, it is possible to reduce a possibility that moisture contained in the exhaust gas condenses to cause dew condensation. Further, since the water or the steam that exchanges the heat with the exhaust gas is supplied from the exhaust heat recovery boiler 2, the exhaust gas can be heated without using another heat source.

Figure 4:
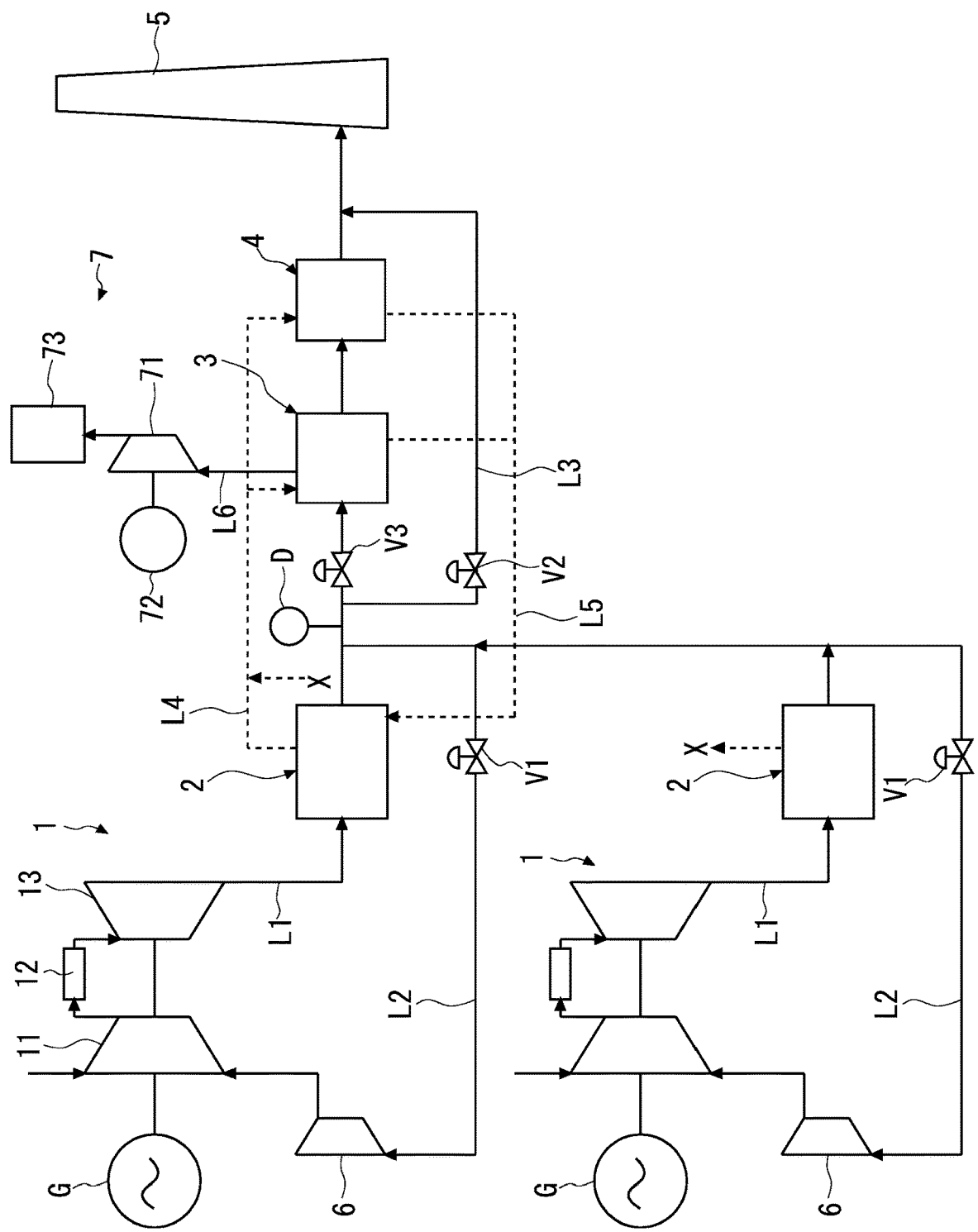
FIG. 4 is a diagram showing a modification example of the gas turbine plant according to the embodiment of the present invention.

In the above, the embodiment of the present invention has been described. Note that various changes and modifications can be made to the configuration described above as long as the gist of the present invention is not deviated. For example, in the above embodiment, the configuration has been described in which the gas turbine plant 100 includes one gas turbine 1, one exhaust heat recovery boiler 2, and one exhaust gas compressor 6. On the other hand, the configuration of the above embodiment is adopted, so that it is possible to reduce the processing capacity required for the carbon dioxide recovery device 3. Stated another way, it is possible to provide a margin to the processing capacity of the carbon dioxide recovery device 3. Therefore, for example, as shown in FIG. 4, dual system gas turbine 1 (that is, two gas turbines 1, two exhaust heat recovery boilers 2, and two exhaust gas compressors 6) can also be provided for one carbon dioxide recovery device 3. As a result, the carbon dioxide recovery device 3 can be further efficiently operated, and the cost and time required for plant construction and maintenance can be reduced.

INDUSTRIAL APPLICABILITY

In the gas turbine plant according to the aspect of the present invention, the carbon dioxide can be further efficiently recovered.

REFERENCE SIGNS LIST

100: gas turbine plant
1: gas turbine
2: exhaust heat recovery boiler
3: carbon dioxide recovery device
4: exhaust gas heater
5: funnel
6: exhaust gas compressor
7: carbon dioxide compression device
11: compressor
12: combustor
13: turbine
21: flue
22: economizer
23: evaporator
24: superheater
31: absorption tower
32: regeneration tower
33: heat exchanger
34: reboiler
36: cooler
61: condenser
62: water supply pump
90: control device
91: input unit
92: timer
93: determination unit
94: valve adjustment unit
D: densitometer
G: generator
L1: exhaust line
L2: circulation line
L3: bypass line
L4: steam supply line
L4b: turbine exhaust line
L5: steam recovery line
L6: recovery line
L31: absorption liquid recovery line
L32: extraction line
L33: absorption liquid heating line
P1: first pump
P2: second pump
ST: steam turbine
V1: first valve device
V2: second valve device
V3: third valve device

What is claimed is:

1. A gas turbine plant comprising:
a gas turbine configured to receive fuel in accordance with a required output, combust the fuel, and be driven by a combustion gas generated by combusting the fuel;
an exhaust line configured to guide an exhaust gas exhausted from the gas turbine to an outside;
a carbon dioxide recovery device provided on the exhaust line and configured to recover carbon dioxide contained in the exhaust gas flowing through the exhaust line;
a circulation line branching from a position on the exhaust line on an upstream side in a flow direction of the exhaust gas with the carbon dioxide recovery device as a reference and connected to the gas turbine;
a first valve device provided on the circulation line;
a bypass line branching from a position on the exhaust line on a downstream side of the circulation line in the flow direction and the upstream side of the carbon dioxide recovery device, bypassing the carbon dioxide recovery device, and connected to a position on the exhaust line on a downstream side of the carbon dioxide recovery device;
a second valve device provided on the bypass line;
a third valve device provided on the exhaust line at a position between the bypass line and the carbon dioxide recovery device;
a densitometer provided on the exhaust line and configured to detect a carbon dioxide concentration in the exhaust gas; and
a control device configured to adjust opening degrees of the first valve device, the second valve device, and the third valve device based on at least one of an operation state of the gas turbine and the carbon dioxide concentration,
wherein the control device is configured to close the first valve device and the third valve device and open the second valve device until a predetermined time elapses from activation of the gas turbine.

2. The gas turbine plant according to claim 1,
wherein the control device is configured to, after a predetermined time has elapsed from activation of the gas turbine, adjust the opening degree of the first valve device in a direction of increasing the opening degree in a state in which the second valve device is opened and the third valve device is closed.

3. The gas turbine plant according to claim 1,
wherein the control device is configured to, after a predetermined time has elapsed from activation of the gas turbine, close the second valve device and open the third valve device in a case in which the carbon dioxide concentration is larger than a predetermined threshold value.

4. The gas turbine plant according to claim 1, further comprising:
an exhaust gas compressor provided on the circulation line and configured to increase a pressure of the exhaust gas flowing through the circulation line.

5. The gas turbine plant according to claim 1, further comprising:
an exhaust heat recovery boiler configured to generate steam by heat of the exhaust gas exhausted from the gas turbine and guide the exhaust gas passing through an inside of the exhaust heat recovery boiler itself to the exhaust line; and
an exhaust gas heater disposed on the exhaust line on the downstream side of the carbon dioxide recovery device in a flow of the exhaust gas,
wherein the exhaust gas heater is a heat exchanger configured to heat the exhaust gas by performing heat exchange between water heated by the exhaust heat recovery boiler or steam generated by the exhaust heat recovery boiler and the exhaust gas flowing through the exhaust line.

6. A gas turbine plant comprising:
a gas turbine configured to receive fuel in accordance with a required output, combust the fuel, and be driven by a combustion gas generated by combusting the fuel;
an exhaust line configured to guide an exhaust gas exhausted from the gas turbine to an outside;
a carbon dioxide recovery device provided on the exhaust line and configured to recover carbon dioxide contained in the exhaust gas flowing through the exhaust line;
a circulation line branching from a position on the exhaust line on an upstream side in a flow direction of the exhaust gas with the carbon dioxide recovery device as a reference and connected to the gas turbine;
a first valve device provided on the circulation line;
a bypass line branching from a position on the exhaust line on a downstream side of the circulation line in the flow direction and the upstream side of the carbon dioxide recovery device, bypassing the carbon dioxide recovery device, and connected to a position on the exhaust line on a downstream side of the carbon dioxide recovery device;
a second valve device provided on the bypass line;
a third valve device provided on the exhaust line at a position between the bypass line and the carbon dioxide recovery device;
a densitometer provided on the exhaust line and configured to detect a carbon dioxide concentration in the exhaust gas;
a control device configured to adjust opening degrees of the first valve device, the second valve device, and the third valve device based on at least one of an operation state of the gas turbine and the carbon dioxide concentration; and
an exhaust heat recovery boiler configured to generate steam by heat of the exhaust gas exhausted from the gas turbine and guide the exhaust gas passing through an inside of the exhaust heat recovery boiler itself to the exhaust line,
wherein the carbon dioxide recovery device includes a regeneration tower configured to regenerate an absorption liquid that absorbs the carbon dioxide in the carbon dioxide recovery device by water heated by the exhaust heat recovery boiler or the steam generated by the exhaust heat recovery boiler.

7. An exhaust carbon dioxide recovery method for a gas turbine plant including a gas turbine configured to receive fuel in accordance with a required output, combust the fuel, and be driven by a combustion gas generated by combusting the fuel, an exhaust line configured to guide an exhaust gas exhausted from the gas turbine to an outside, a carbon dioxide recovery device provided on the exhaust line and configured to recover carbon dioxide contained in the exhaust gas flowing through the exhaust line, a circulation line branching from a position on the exhaust line on an upstream side in a flow direction of the exhaust gas with the carbon dioxide recovery device as a reference and connected to the gas turbine, a first valve device provided on the circulation line, a bypass line branching from a position on the exhaust line on a downstream side of the circulation line in the flow direction and the upstream side of the carbon dioxide recovery device, bypassing the carbon dioxide recovery device, and connected to a position on the exhaust line on a downstream side of the carbon dioxide recovery device, a second valve device provided on the bypass line, a third valve device provided on the exhaust line at a position between the bypass line and the carbon dioxide recovery device, and a densitometer provided on the exhaust line and configured to detect a carbon dioxide concentration in the exhaust gas, the method comprising:
adjusting opening degrees of the first valve device, the second valve device, and the third valve device based on at least one of an operation state of the gas turbine and the carbon dioxide concentration,
wherein said adjusting operation includes:
closing the first valve device and the third valve device; and
opening the second valve device until a predetermined time elapses from activation of the gas turbine.

* * * * *